United States Patent
Claycomb et al.

(10) Patent No.: US 11,038,594 B1
(45) Date of Patent: Jun. 15, 2021

(54) SELF-INSULATING HIGH BANDWIDTH CONNECTOR

(71) Applicants: Kevin D. Claycomb, Newburgh, IN (US); Andrew Charles Gray, Annapolis, MD (US); Lauren Nicole Lagua, Bowie, MD (US); David Nelson Dittman, Elkridge, MD (US); Vincent Michael Iorio, Arnold, MD (US); David Andrew Smallwood, Millersville, MD (US); James Richard Windgassen, Chester, MD (US)

(72) Inventors: Kevin D. Claycomb, Newburgh, IN (US); Andrew Charles Gray, Annapolis, MD (US); Lauren Nicole Lagua, Bowie, MD (US); David Nelson Dittman, Elkridge, MD (US); Vincent Michael Iorio, Arnold, MD (US); David Andrew Smallwood, Millersville, MD (US); James Richard Windgassen, Chester, MD (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 15/930,596

(22) Filed: May 13, 2020

(51) Int. Cl.
*H04B 10/40* (2013.01)
*H01R 13/523* (2006.01)
*H04B 10/114* (2013.01)
*H01R 13/717* (2006.01)
*H01R 13/03* (2006.01)

(52) U.S. Cl.
CPC .......... *H04B 10/40* (2013.01); *H01R 13/523* (2013.01); *H04B 10/114* (2013.01); *H01R 13/03* (2013.01); *H01R 13/717* (2013.01)

(58) Field of Classification Search
CPC ........ H04B 10/40; H04B 10/114; G02B 6/26; G02B 6/4296
See application file for complete search history.

(56) References Cited

U.S. PATENT DOCUMENTS

| 110,422 A | 12/1870 | Beau |
| 3,475,795 A | 11/1969 | Youngblood |
(Continued)

FOREIGN PATENT DOCUMENTS

| EP | 2728983 A1 | 5/2014 |
| JP | S5830174 A | 2/1983 |
(Continued)

OTHER PUBLICATIONS

Japanese Office Action for Application No. 2019-528086 dated Jul. 21, 2020.
(Continued)

*Primary Examiner* — Dzung D Tran
(74) *Attorney, Agent, or Firm* — Tarolli, Sundheim, Covell & Tummino LLP (57) ABSTRACT

A high-bandwidth underwater electrical connector is provided that includes first and second connectors each having free space optical transceivers. The electrical connector further includes self-passivating transition metal contacts that form a non-conductive outer layer when immersed in a fluid. The first and second free space optical transceivers transmit and receive data at high data speeds.

20 Claims, 8 Drawing Sheets

(56) References Cited

U.S. PATENT DOCUMENTS

| | | |
|---|---|---|
| 4,160,609 A | 7/1979 | Jackson et al. |
| 4,338,149 A | 7/1982 | Quaschner |
| 4,466,184 A | 8/1984 | Cuneo et al. |
| 4,687,695 A | 8/1987 | Hamby |
| 4,715,928 A | 12/1987 | Hamby |
| 4,737,118 A | 4/1988 | Lockard |
| 5,130,691 A | 7/1992 | Shintaku et al. |
| 5,160,269 A | 11/1992 | Fox, Jr. et al. |
| 5,161,981 A | 11/1992 | Deak et al. |
| 5,419,038 A | 5/1995 | Wang et al. |
| 5,854,534 A | 12/1998 | Beilin et al. |
| 6,040,624 A | 3/2000 | Chambers et al. |
| 6,603,079 B2 | 8/2003 | Biron |
| 6,793,544 B2 | 9/2004 | Brady et al. |
| 6,924,551 B2 | 8/2005 | Rumer et al. |
| 7,012,812 B2 | 3/2006 | Haba |
| 7,251,712 B2 | 7/2007 | Unno |
| 7,407,408 B1 | 8/2008 | Taylor |
| 7,911,029 B2 | 3/2011 | Cui |
| 8,118,611 B2 | 2/2012 | Jeon |
| 8,135,281 B2 | 3/2012 | Zhovnirovsky et al. |
| 8,262,873 B2 | 9/2012 | Wurm et al. |
| 8,359,738 B2 | 1/2013 | Takahashi et al. |
| 9,197,006 B2 | 11/2015 | Hack |
| 9,485,860 B2 | 11/2016 | Yosui |
| 9,743,529 B2 | 8/2017 | Lee et al. |
| 9,847,632 B2 | 12/2017 | Zivi et al. |
| 10,355,334 B2 | 7/2019 | Bokenfohr et al. |
| 2003/0114026 A1 | 6/2003 | Caldwell |
| 2004/0038072 A1 | 2/2004 | Miura |
| 2004/0043675 A1 | 3/2004 | Hiatt et al. |
| 2004/0049914 A1 | 3/2004 | Wang et al. |
| 2009/0014205 A1 | 1/2009 | Kobayashi et al. |
| 2010/0063555 A1 | 3/2010 | Janzig et al. |
| 2010/0112833 A1 | 5/2010 | Jeon |
| 2012/0042481 A1 | 2/2012 | Kempf |
| 2013/0089290 A1* | 4/2013 | Sloey ............... G02B 6/389 385/74 |
| 2013/0196855 A1 | 8/2013 | Poletto et al. |
| 2014/0175671 A1 | 6/2014 | Haba et al. |
| 2014/0353014 A1 | 12/2014 | Lai |
| 2014/0364004 A1 | 12/2014 | Oniki |
| 2015/0011107 A1 | 1/2015 | Hack |
| 2015/0055914 A1* | 2/2015 | Dell'Anno ........... G02B 6/4246 385/28 |
| 2016/0014893 A1 | 1/2016 | Yosui |
| 2016/0100012 A1 | 4/2016 | Haugseth et al. |
| 2016/0233607 A1 | 8/2016 | Windgassen et al. |
| 2017/0149231 A1 | 5/2017 | Zivi et al. |
| 2018/0160304 A1* | 6/2018 | Liu .................... H01P 3/16 |
| 2019/0027800 A1 | 1/2019 | El Bouayadi et al. |
| 2019/0074568 A1* | 3/2019 | Henry ................. H01P 5/188 |
| 2019/0313530 A1 | 10/2019 | Hartman |
| 2020/0006655 A1* | 1/2020 | Tang .................. H01L 23/544 |
| 2020/0069855 A1* | 3/2020 | Matthes ............. A61M 60/268 |
| 2020/0083927 A1* | 3/2020 | Henry ................. H04B 3/546 |

FOREIGN PATENT DOCUMENTS

| | | |
|---|---|---|
| JP | 2002064271 A | 2/2002 |
| WO | 2006/132108 A1 | 12/2006 |
| WO | 2019/096655 A1 | 5/2019 |

OTHER PUBLICATIONS

Brown et al.: "Development, Testing and Track Record of Multi-Way Underwater Mateable Fiber-Optic Connectors or Deepwater Applications"; Copyright 2002, Offshore Technology Conference This paper was prepared for Presentation at the 2002 Offshore Technology Conference held in Houston, Texas U.S.A., May 6-9, 2002.

Kaushal et al.: "Free Space Optical Communication: Challenges and Mitigation Techniques"; Department of Electrical, Electronics and Communication Engineering, ITM University, Gurgaon, Haryana, India—122017. Département de génie électrique, École de technologie supérieure, Montréal (Qc), Canada; Jun. 16, 2015.

Mabrouk et al.: "Experimental Validation of Receiver Sensitivity for 100-Mbps Data Rates in Seawater by Using 2.4 GHz-Low-Power Electronics"; International Journal on Communications Antenna and Propagation (I.Re.C.A.P.), vol. 9, N. 1 ISSN 2039-5086 Feb. 2019.

Mendez et al.: "A Comparative Study of Underwater Wireless Optical Communication for Three Different Communication Links"; IOSR Journal of Electronics and Communication Engineering (IOSR-JECE) e-ISSN: 2278-2834,p-ISSN: 2278-8735.vol. 10, Issue 3, Ver. II (May-Jun. 2015), pp. 40-48 www.iosrjournals.org.

RMS Pump Tools: Subsea Wet-Mate & Dry-Mate Connector Systems; found on the internet on Apr. 14, 2020 at: http://www.rmspumptools.com/perch/resources/brochures/subsea-connectors-1.pdf.

"Wet-Mate-Connector-Study"; found on the internet Apr. 14, 2020 at https://ore.catapult.org.uk/app/uploads/2018/01/Wet-mate-connector-study.pdf.

International Search Report for Application No. PCT/US2020/054257 dated Jan. 21, 2021.

Korean Office Action for Application No. 10-2019-7015946 dated Jan. 28, 2021.

Non Final Office Action for U.S. Appl. No. 16/806,575 dated Mar. 18, 2021.

* cited by examiner

SELF-INSULATING HIGH BANDWIDTH CONNECTOR

TECHNICAL FIELD

This disclosure relates generally to electrical connectors, and more specifically to a system comprising a high data transfer rate hybrid electrical and optical connector.

BACKGROUND

Conventional wet mate connectors that provide high-power and high-bandwidth are large, heavy, unreliable, and difficult to mate underwater. Conventional connectors have a limited number of insertions and are extremely expensive to manufacture due to their size. Large unmanned underwater vehicles (UUV) or remote operating vehicles (ROV) are required to mate these connectors on the ocean floor. In other words, conventional connectors are large, bulky, and difficult to mate underwater thus, conventional connectors require expensive infrastructure along with the UUV's or ROV's to mate the connectors. As a result, establishing a large and flexible network utilizing conventional connectors is very time consuming, risky, cost prohibitive, and difficult to implement.

SUMMARY

The following presents a simplified summary in order to provide a basic understanding of the subject disclosure. This summary is not an extensive overview of the subject disclosure. It is not intended to identify key/critical elements or to delineate the scope of the subject disclosure. Its sole purpose is to present some concepts of the subject disclosure in a simplified form as a prelude to the more detailed description that is presented later.

One example of the subject disclosure, a system that includes a first connector including first contacts and a first optical assembly to transmit and receive free space optical signals and a second connector including second contacts and a second optical assembly to transmit and receive the free space optical signals. At least one contact from the first contacts and at least one contact from the second contacts that aligns with the at least one contact from the first contacts being made from a self-passivating transition metal that has a property of forming a non-conductive outer layer when subjected to an adverse environment. The first and second connectors are coupled to substantially align and enclose the first and second optical assemblies, wherein when subjected to the adverse environment, a fluid-filled gap is formed between the first optical assembly and the second optical assembly in response to mating the first and second connectors.

Another example of the subject disclosure includes a high-bandwidth underwater electrical connector that includes a first connector including first contacts having at least one first self-passivating transition metal contact that forms a non-conductive outer layer when immersed in adverse environment to transmit power and a first free space optical assembly to transmit and receive free space optical signals, The connector further includes a second connector including second contacts having at least one second self-passivating transition metal contact that forms a non-conductive outer layer when immersed in the adverse environment to receive power and a second free space optical assembly to transmit and receive the free space optical signals, the first and second connectors being configured to be coupled to substantially align and enclose the first and second free space optical assemblies. When subjected to the adverse environment, a fluid-filled gap is formed between the first and second free space optical assemblies in response to fastening the first and second connectors and where the first and second free space optical assemblies transmit and receive the free space optical signals.

In still another example of the subject disclosure includes a method for transmitting free space optical signals carrying data. The method includes immersing a first connector and a second connector in an adverse environment, the first connector includes first contacts having at least one first self-passivating transition metal contact that forms a non-conductive outer layer when immersed in the adverse environment and a first free space optical transceiver. The second connector includes second contacts having at least one second self-passivating transition metal contact that forms a non-conductive outer layer when immersed in the fluid and a second free space optical transceiver, the at least one first self-passivating transition metal contact being aligned with and connected to the at least one second self-passivating transition metal contact. The first and second connectors are mated to provide an electrical connection between the first contacts and the second contacts to conduct power between the first and second connectors and to form a fluid-filled gap between the first free space optical transceiver and the second free space optical transceiver. The first and second free space optical transceivers transmit and receive the free space optical signals through the fluid-filled gap.

BRIEF DESCRIPTION OF THE DRAWINGS

The accompanying drawings, which are incorporated in and constitute a part of the specification, illustrate various systems, methods, and other examples of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

The disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure can be practiced without these specific details. In other instances, well-known structures and devices are shown in block diagram form in order to facilitate describing the subject disclosure.

While specific characteristics are described herein (e.g., thickness, orientation, configuration, etc.), it is to be understood that the features, functions and benefits of the subject disclosure can employ characteristics that vary from those described herein. These alternatives are to be included within the scope of the disclosure and claims appended hereto.

The current connector technology used to transfer high-power and large amounts of data quickly underwater is bulky, expensive, or unable to meet the high-power and high-bandwidth demands of the growing underwater technology community. Wet mate communication grade cables are not self-insulating, require dexterity and significant force to mate, and have a very limited connection life. Long range free space optical (FSO) devices, such as the Bluecomm series, are designed for more omnidirectional communication at significant distances (e.g., greater than 5 meters). Because of these requirements, the devices are large, expensive, power-hungry, and have a low data bandwidth. The use of long range FSO devices would be limited in an ever-growing seabed network with high-bandwidth needs especially since the devices cannot provide power. Wireless power connectors have potential for use in an underwater network but are expensive, bulky and heavy. Another drawback is that they impose an electrical efficiency penalty, paid in the form of the transmission technique.

In order to overcome these obstacles, disclosed herein is an example of a high-power, high-bandwidth electrical connector for use in corrosive or adverse environments such as being immersed in water (e.g., seawater, saltwater, well water, river water, lake water, etc.) or other electrolytic fluid. The electrical connector utilizes free space optical (FSO) communication devices to transmit and receive large amounts of data at high data rates (high-bandwidth) of approximately 10 Gbps. Specifically, the FSO devices use short range light to transfer the data at high data rates. The electrical connector further includes electrical contacts that can transmit and provide power if required for a desired power application. The contacts, i.e. the anodic contact, are made from a self-passivating transition metal (e.g., niobium, tantalum, titanium, zirconium, molybdenum, ruthenium, rhodium, palladium, hafnium, tungsten, rhenium, osmium, iridium, etc.). Self-passivating transition metals form an insulation layer or non-conductive passivation outer layer on the surface of the contact to protect the contact from the corrosive effects of an adverse environment (e.g., seawater, saltwater, well water, river water, lake water, etc.), as described in U.S. Pat. No. 9,893,460, which is incorporated herein by reference in its entirety.

The high-bandwidth connector includes three sections for data handling: 1) incoming/outgoing data; 2) translation of data; and 3) FSO communications. The incoming data from a device travels along a traditional copper or fiber optic pathway inside the connector's cable. Once the incoming signal arrives at the high-bandwidth underwater connector, a processor (e.g., a field-programmable gate array (FPGA), an application-specific integrated circuit (ASIC), a digital signal processor (DSP), etc.) translates the data into differential pair signals. These signals are then passed to an FSO transceiver which sends the data through a laser beam. This beam and translated differential pair signals are received by the other connector's FSO transceiver. The signals are then read and translated by an FPGA in the receiving connector and transmitted to a receiving device through an electric or fiber optic pathway. Power for the FPGA and FSO devices is leeched from the power cables passing through the high-bandwidth underwater connector.

Figure 1:
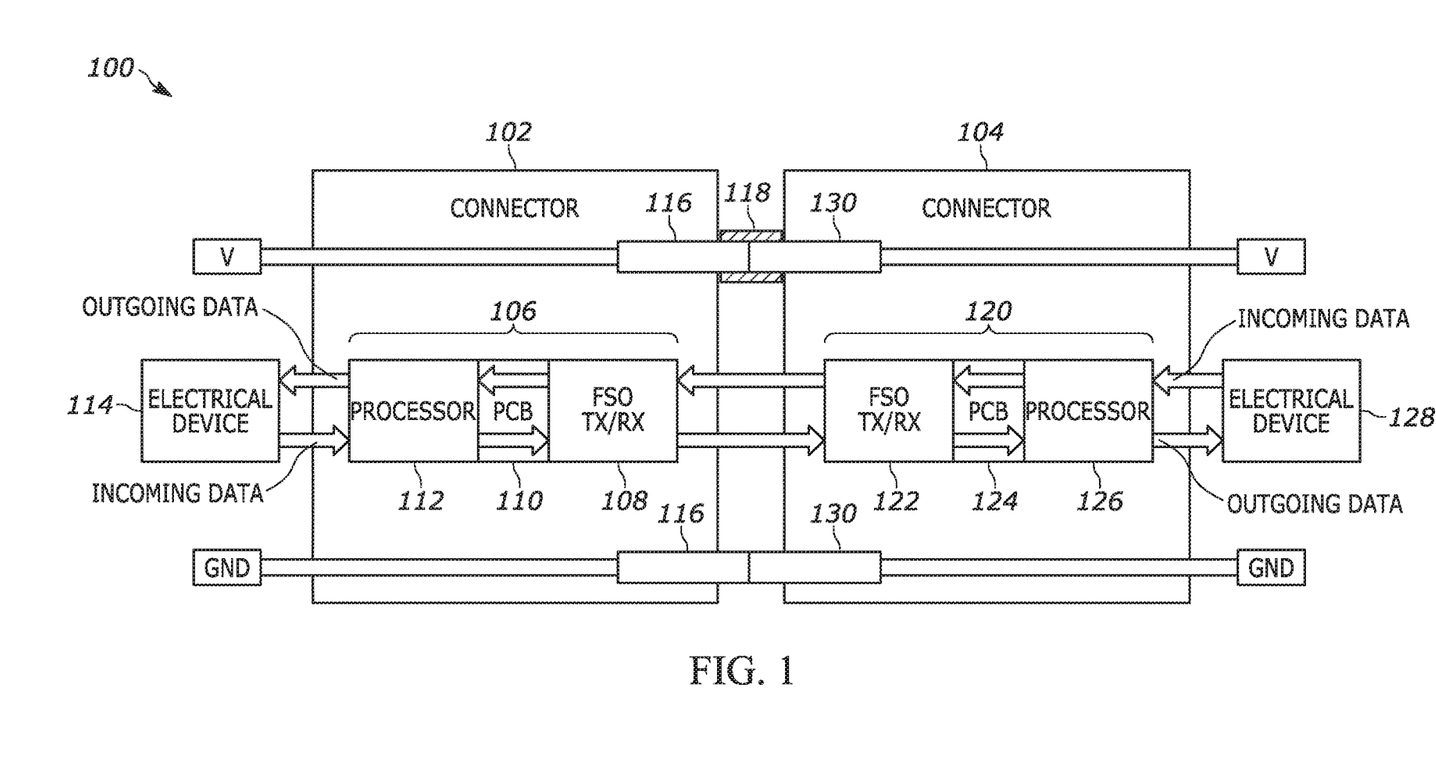
FIG. 1 illustrates an example schematic diagram of an example high-bandwidth connector system.

FIG. 1 schematically illustrates an example of a system to enable mating and un-mating of exposed electrical contacts in an underwater environment that includes optical data communication devices that transfer data at a high speed or data rate (e.g., approximately 10 Gbps). Specifically, disclosed herein is a system comprised of a high-bandwidth underwater electrical connector 100 that includes free space optical devices that transfers data at a high speed via short range (e.g., less than 6 cm) light waves (e.g., laser). For purposes herein, the connector will be referred to as a "high-bandwidth connector" and will be described as being immersed in a water environment. It is understood however, that the high-bandwidth connector can be exposed to any type of adverse environment such as those mentioned above that would have an adverse effect on the connector including non-underwater adverse environments, e.g., chemical plants.

Still referring to FIG. 1, the high-bandwidth connector 100 includes a first connector (mating component) 102 having a first housing and a second connector (mating component) 104 having a second housing. The first connector 102 includes one or more first optical (e.g., FSO) data communication assemblies 106. Each first optical assembly 106 includes a first FSO transceiver 108 mounted to a first printed circuit board (PCB) 110 and a first processor 112 connected to the PCB 110. Data signals are communicated from a first external electrical device 114 via traditional copper or fiber optic cables to and from the first processor 112. The first processor 112 translates the incoming data signals into a differential pair signals and communicates them to the first FSO transceiver 108. Similarly, outgoing data signals are transmitted from the first FSO transceiver 108 to the first processor 112 whereupon the first processor 112 processes the outgoing data signals and transmits the outgoing data signals to the first external electrical device 114 along the same copper or fiber optic cables. In one example, the first processor 112 can be an FPGA, an ASIC, a DSP, etc. that can be programmed and depending on the processor re-programmed to a given communication configuration based on the application of the high-bandwidth connector 100.

The first connector 102 further includes first electrical contacts 116 having at least one first contact (e.g., anodic contact) made from a self-passivating transition metal (e.g., niobium, tantalum, titanium, zirconium, molybdenum, ruthenium, rhodium, palladium, hafnium, tungsten, rhenium, osmium, iridium, etc.). Electrical contacts made from a transition metal are suitable for mating and un-mating in an underwater or adverse environment due to the formation of a non-conductive passivation outer layer 118 that forms on the first electrical contacts 116 when immersed in a fluid such as water. As mentioned above, the passivation outer layer 118 protects the contact from the corrosive effects of an adverse environment such as in fluids, such as water (e.g., seawater, saltwater, well water, river water, lake water, etc.). The term contact can refer to any type of electrically conducting mating component, such as pins, receptors, plates, etc.

Still referring to FIG. 1, the second connector 104 includes a one or more second optical (e.g., FSO) data communication assemblies 120. Each second optical assembly 120 includes a second FSO transceiver 122 mounted to a second PCB 124 and a second processor 126 connected to the second PCB 124. Data signals are communicated from a second external electrical device 128 via traditional copper or fiber optic cables to and from the second processor 126. The second processor 126 translates the incoming data signals into a differential pair signals and communicates them to the second FSO transceiver 122. Similarly, outgoing data signals are transmitted from the second FSO transceiver 122 to the second processor 126 whereupon the second processor 126 processes the outgoing data signals and transmits the outgoing data signals to the second external electrical device 128 along the same copper or fiber optic cables. In one example, the second processor 126 can be an FPGA, an ASIC, a DSP, etc. that can be programmed and depending on the processor re-programmed to a given communication configuration based on the application of the high-bandwidth connector 100.

The second connector 104 further includes second electrical contacts 130 having at least one second contact (e.g., an anodic contact) made from the self-passivating transition metal (e.g., niobium, tantalum, titanium, zirconium, molybdenum, ruthenium, rhodium, palladium, hafnium, tungsten, rhenium, osmium, iridium, etc.). Thus, similar to the at least one first transition metal contact, the non-conductive passivation outer layer 118 forms on the at least one second transition metal contact to protect the contacts from the corrosive effects of the adverse environment and prevents conduction between the anodic and cathodic contacts via ionic conduction through the fluid environment if it is electrolytic. When the first and second connectors 102, 104 are mated, the at least one first transition metal contact and the at least one second transition metal contact are aligned and engaged to form an electrical connection.

After the FSO transceiver 108, 122 receives the incoming signal from the processor 112, 126, the FSO transceiver 108, 122 transmits the signal to the other FSO transceiver 122, 108 (i.e., the first FSO transceiver 108 transmits to the second FSO transceiver 122 and the second FSO transceiver 122 transmits to the first FSO transceiver 108) via a short range light wave, such as a laser. The distance between the first and second FSO transceivers 108, 122 is in the range of 1-6 cm.

As will be explained further below, each FSO transceiver 108, 122 is enclosed in an optical housing that has an opening defined in a surface of the housing. An optical lens (disk) is disposed in the opening to allow the light to travel between the first and second FSO transceivers 108, 122. Thus, the transmitted light that carries the data signal travels through a gap in the optical housing before traveling through the optical lens in the transmitting FSO transceiver. The light then travels through the adverse medium that the high-bandwidth connector 100 is immersed in to the receiving FSO assembly. Finally, the light travels through an optical lens and a gap in the optical housing in the receiving FSO assembly to the receiving FSO transceiver. The gap in the optical housing of both the transmitting and receiving FSO assemblies may be an air gap or may be filled with a medium (e.g., gel, oil) that has a refractive index that closely matches a refractive index of the optical lens.

As mentioned above, in applications where the connector is immersed in water and water resides inside the connector, the FSO communication devices can still transmit and receive large amounts of data at high data rates (high-bandwidth) of approximately 10 Gbps. In addition, the transition metal electrical contacts can transmit and provide power for a desired power application. As a result, the high-bandwidth connector 100 is a light-weight, high-bandwidth, high-power, self-insulating, low noise, waterproof connector designed for underwater applications or for use in adverse environments.

Figure 2:
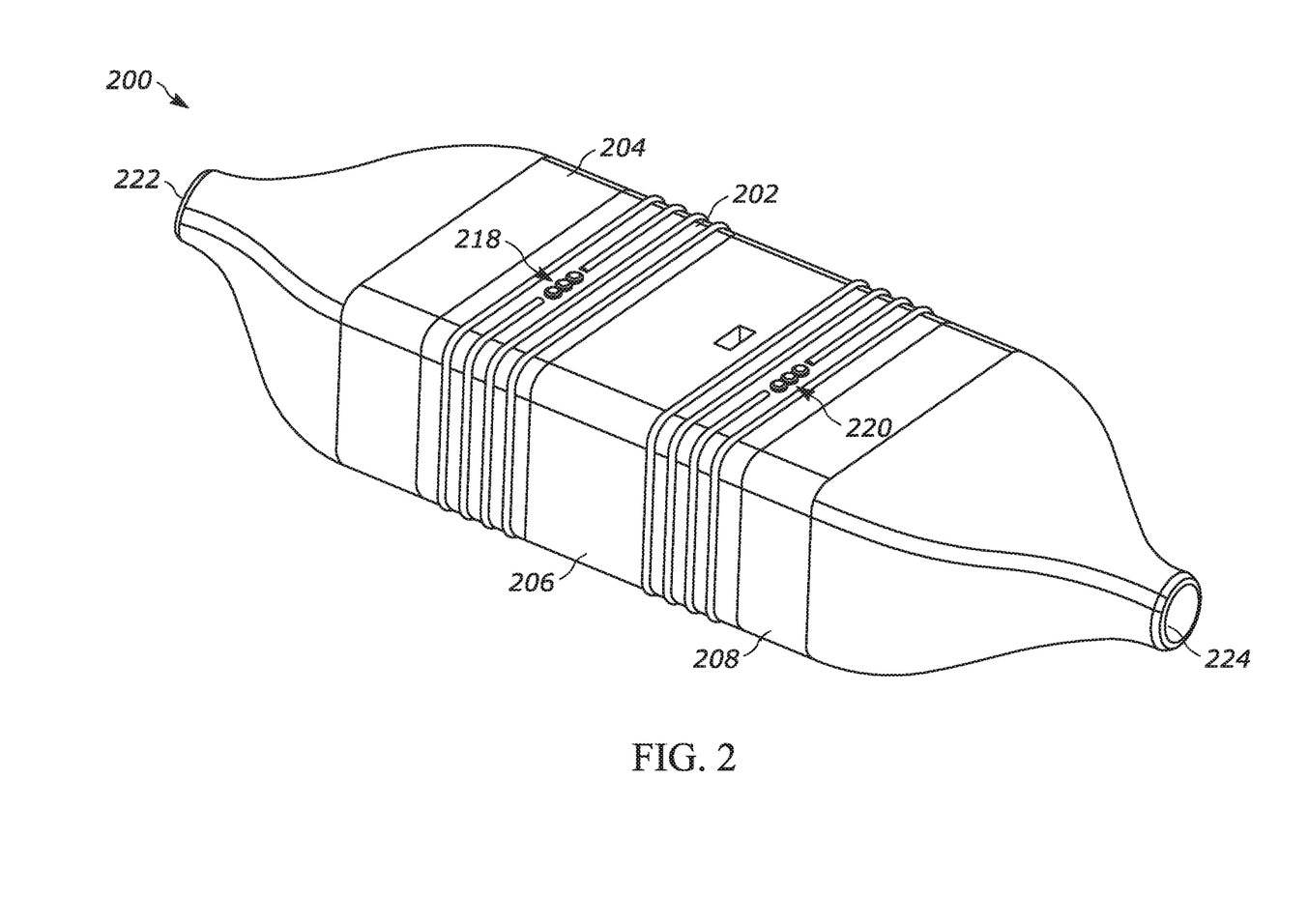
FIG. 2 illustrates an example of a high-bandwidth electrical connector.
Figure 3:
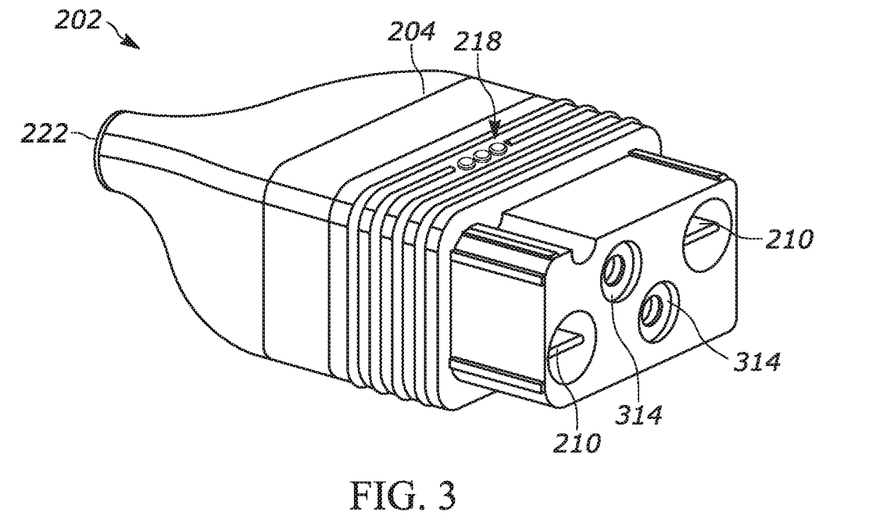
FIG. 3 illustrates a perspective view of an example of a first mating component of the example high-bandwidth electrical connector.
Figure 4:
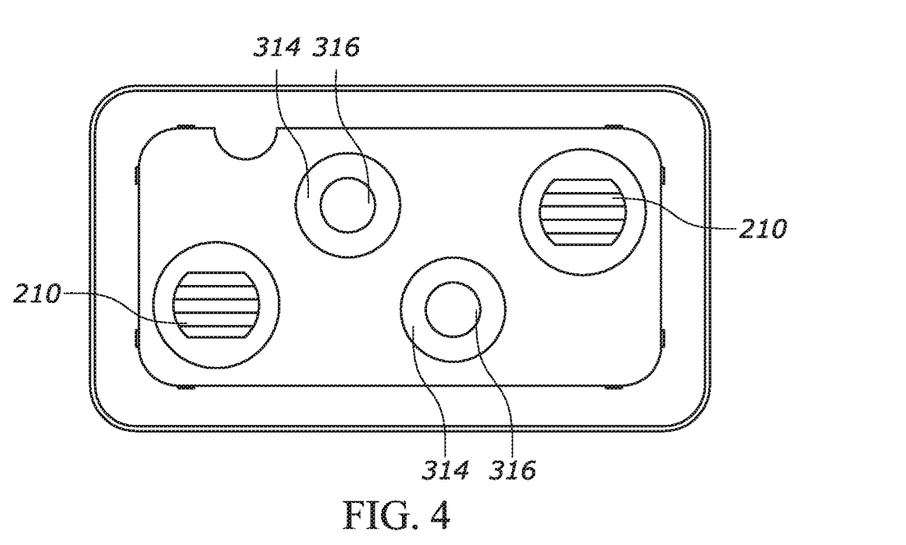
FIG. 4 illustrates an end view of the example first mating component of the example high-bandwidth electrical connector.
Figure 5:
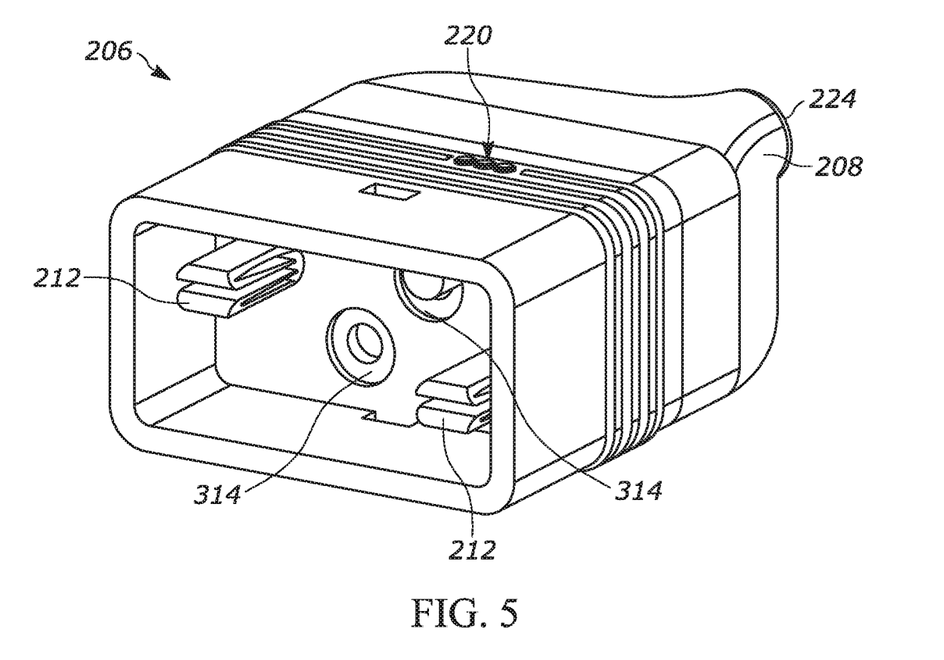
FIG. 5 illustrates a perspective view of an example of a second mating component of the example high-bandwidth electrical connector.
Figure 6:
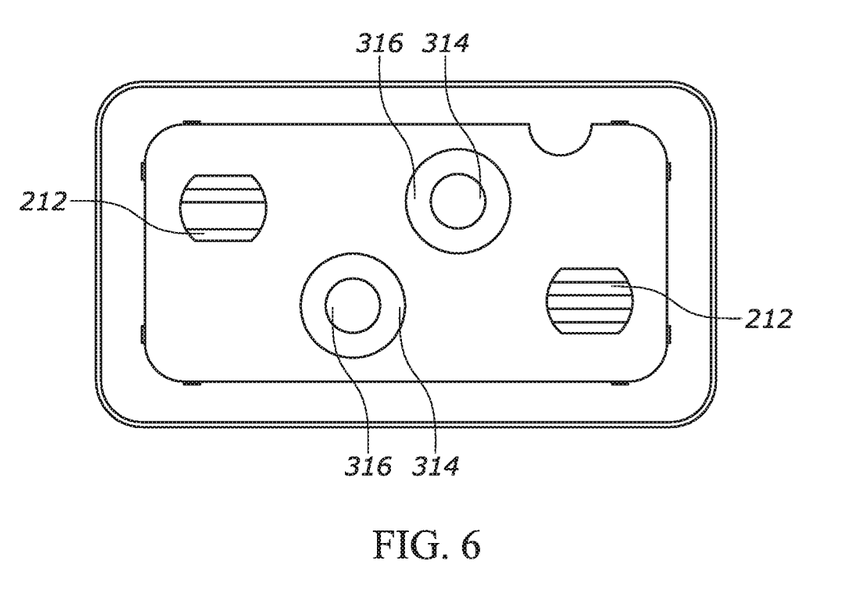
FIG. 6 illustrates an end view of the example second mating component of the example high-bandwidth electrical connector.
Figure 7:
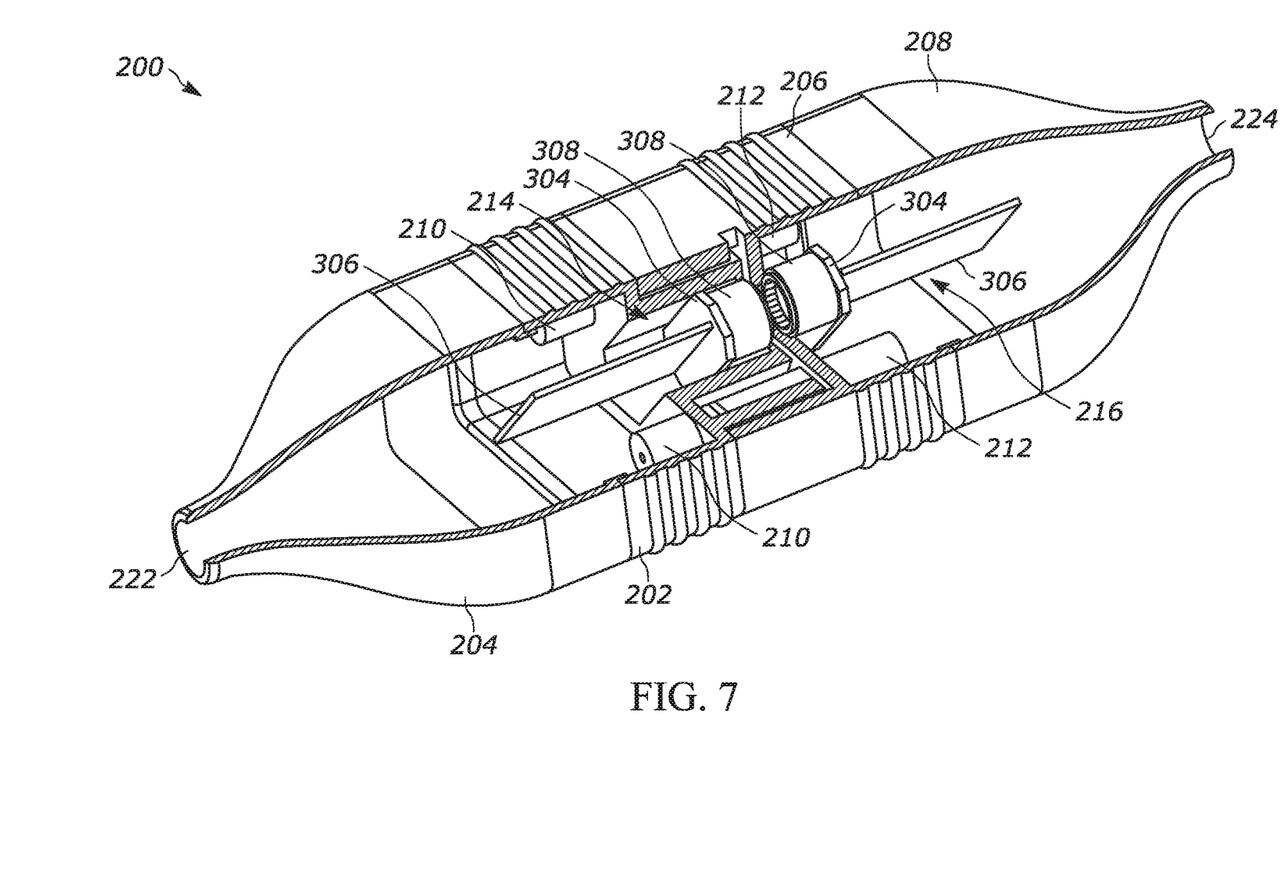
FIG. 7 illustrates a perspective, cut-out view of the example high-bandwidth connector illustrated in FIG. 2.

FIGS. 2-7 illustrate one example of a high-bandwidth connector 200 for use in underwater applications. FIG. 2 is a perspective view of the high-bandwidth connector 200 in an assembled state. The high-bandwidth connector 200 includes a first mating component (connector) 202 having a first housing 204 and a second mating component (connector) 206 having a second housing 208. FIGS. 3 and 4 are perspective and end views of the first mating component 202 respectively. Similarly, FIGS. 5 and 6 are perspective and end views of the second mating component 206 respectively. FIG. 7 is a perspective, cut-out view of the high-bandwidth connector 200.

In the example illustrated in FIGS. 2-7, the first mating component 202 is a male connector that includes male (first) contacts 210 and the second mating component 206 is a female mating component that includes female (second) contacts 212. As described above, at least one contact (e.g., anodic contacts) from each of the male and female contacts 210, 212 of the first and second mating components 202, 206 respectively are made from a self-passivating transition metal (e.g., niobium, tantalum, titanium, zirconium, molybdenum, ruthenium, rhodium, palladium, hafnium, tungsten, rhenium, osmium, iridium, etc.), herein referred to as first and second transition metal contacts. As mentioned above, self-passivating transition metals form an insulation layer or skin on the surface of the contact to protect the contact from the corrosive effects of water. When the first and second mating components 202, 206 are mated, the first and second transition metal contacts are aligned and engaged to form an electrically conductive connection. When the first and second mating components 202, 206 are mated, the male contacts 210 are inserted into the female contacts 212 such that at least a portion of the self-passivation layer is removed (scraped off) on each of the first and second transition metal contacts to form the electrically conductive connection.

As best shown in FIG. 7, the first mating component 202 further includes a first FSO communication assembly 214 and the second mating component 206 further includes a second FSO communication assembly 216. As described above, data signals are communicated between the first and second FSO communication assemblies 214, 216 at a high rate of speed to transfer data from one external electrical device (e.g., first external electrical device 114) to another external electrical device (e.g., second external electrical device 128) and vice versa.

The first mating component 202 and the second mating component 206 further include status indicators 218, 220. The status indicators 218, 220 may include lights, LED lights, symbolic lights, colored lights, etc. The status indicators 218, 220 may be situated on an outer portion, as illustrated in FIG. 2, or an inner portion of the first connector and/or the second connector. The status indicators 218, 220 may be used to provide an operating status of the high-bandwidth connector 200. For example, one status indicator may provide a power status, another status indictor may provide a status of the received and transmitted data, and another status indicator may provide a status of the light source that carries the data signal between the first and second FSO communication assemblies 214, 216.

The first mating component 202 and the second mating component 206 further include an opening 222, 224 defined in an end opposite that of the contacts 210, 212. The opening 222, 224 is configured to allow the insertion of power and data transmission cables (e.g., copper, fiber optic, etc.). The power cables transmit power from a power source to the male and female contacts 210, 212 and the data transmission cable transmits the data signals between the external electrical devices and the FSO communication assemblies 214, 216.

Figure 8:
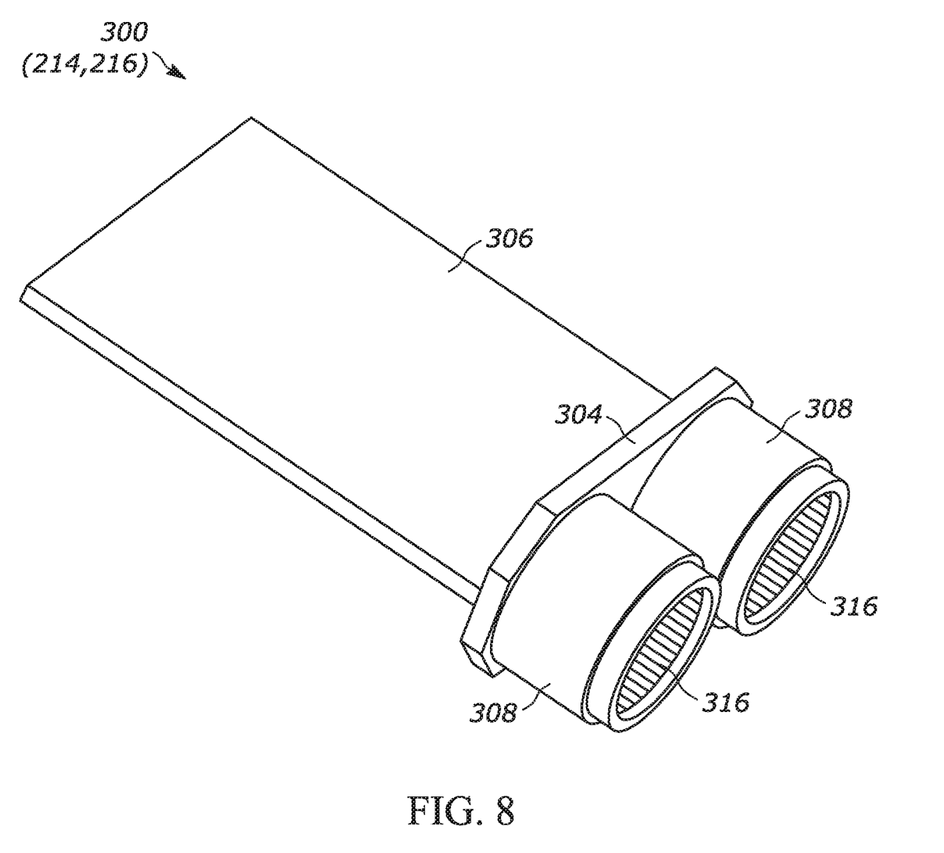
FIG. 8 illustrates a perspective view of an example free space optical (FSO) assembly.
Figure 9:
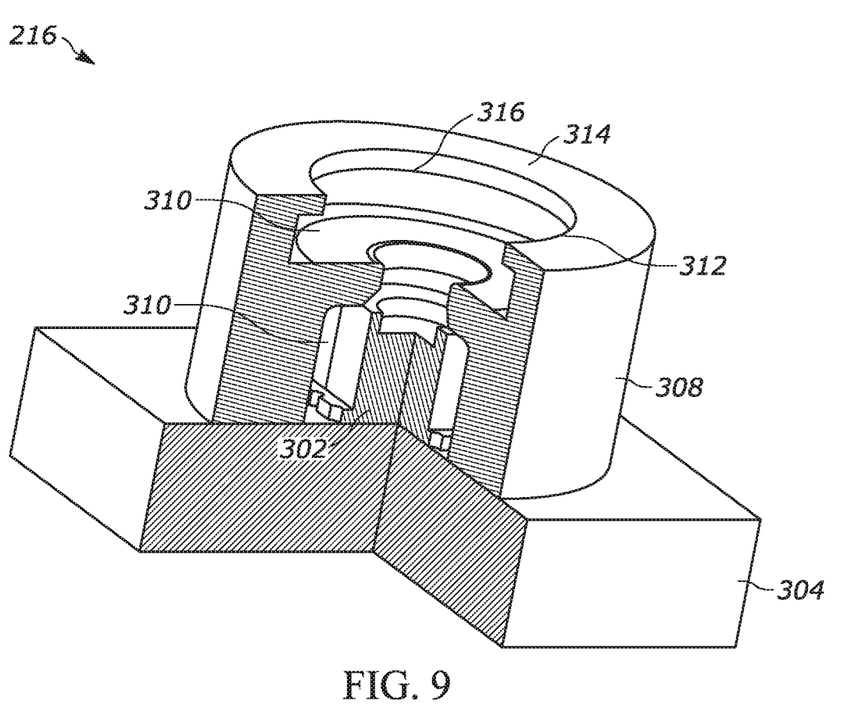
FIG. 9 illustrates a perspective, cut out view of an example optical housing and FSO transceiver.

FIG. 8 is a perspective view of an example FSO assembly 300 that corresponds to the FSO assemblies 214, 216 illustrated in FIG. 7. In addition, FIG. 9 is a partial, cut-out view of the FSO assembly 300 illustrated in FIG. 8. Thus, reference is to be made to the example of FIG. 7 in the following description of the example of FIGS. 8 and 9. The FSO assembly 300 includes one or more FSO transceivers 302 mounted to a printed circuit board (PCB) 304 and a processor (e.g., an FPGA, an ASIC, a DSP, etc.) 306 connected to and in communication with the PCB 304. An optical housing 308 is also mounted to the PCB 304 and encloses the FSO transceiver 302 in a cavity. Thus, a gap 310 exists between the FSO transceiver 302 and an inner surface of the optical housing 308. The gap 310 in the optical housing 308 may be an air gap or may be filled with a medium (e.g., gel, oil) that has a refractive index that closely matches a refractive index of an optical lens 316. An opening 312 is defined in a surface (e.g., top) 314 of the optical housing 308 that is opposite that of a surface mounted to the PCB 304. The optical lens (disk) 316 is disposed in the opening 312 to allow the light to travel between, for example, the FSO assemblies 214, 216 illustrated in FIG. 7. The optical lens 316 is made from a material (e.g., sapphire, quartz, acrylic, soda lime, borosilicate etc.) that is capable of transmitting the data signal at the high speeds disclosed herein under hydrostatic pressure at full ocean depth (e.g., approximately 10,000 psi) in the infrared band and more specifically, in the near infrared band. Thus, the optical lens 316 isolates the FSO transceiver 302 from the water, i.e., provides waterproofing, while allowing a pathway for the transmission of the FSO lightwaves.

As previously explained, the data signals are communicated from external electrical devices via traditional copper or fiber optic cables to and from the FSO assemblies 300. The processor 306 translates incoming data signals into a differential pair signals and communicates them to the transmitting FSO transceiver 302. The transmitting FSO transceiver 302 transmits the data signal to the other, i.e., receiving, FSO transceiver 302 via a short range light wave, such as a laser. The distance between the transmitting and the receiving FSO transceivers 302 is in the range of 1-6 cm. The received data signal is then sent from the receiving FSO transceiver 302 to the receiving processor 306 whereupon the receiving processor 306 processes the outgoing data signals and transmits the outgoing data signals to an external electrical device via copper or fiber optic cables. The FSO transceivers 302 are capable of transmitting and receiving data. Thus, two-way communication is possible, which increases the amount of data that can be transmitted. In addition, each FSO assembly can include multiple FSO transceivers thereby increasing the number of transmitting data communication lines.

The transmitted light that carries the data signal travels through the air gap 310 in the optical housing 308 before traveling through the optical lens 316 in the transmitting FSO transceiver 302. The light then travels through the adverse medium (e.g., water) that the high-bandwidth connector is immersed in to the receiving FSO transceiver 302. Finally, the light travels through the optical lens 316 and the gap 310 in the optical housing 308 in the receiving FSO transceiver 302.

Figure 10:
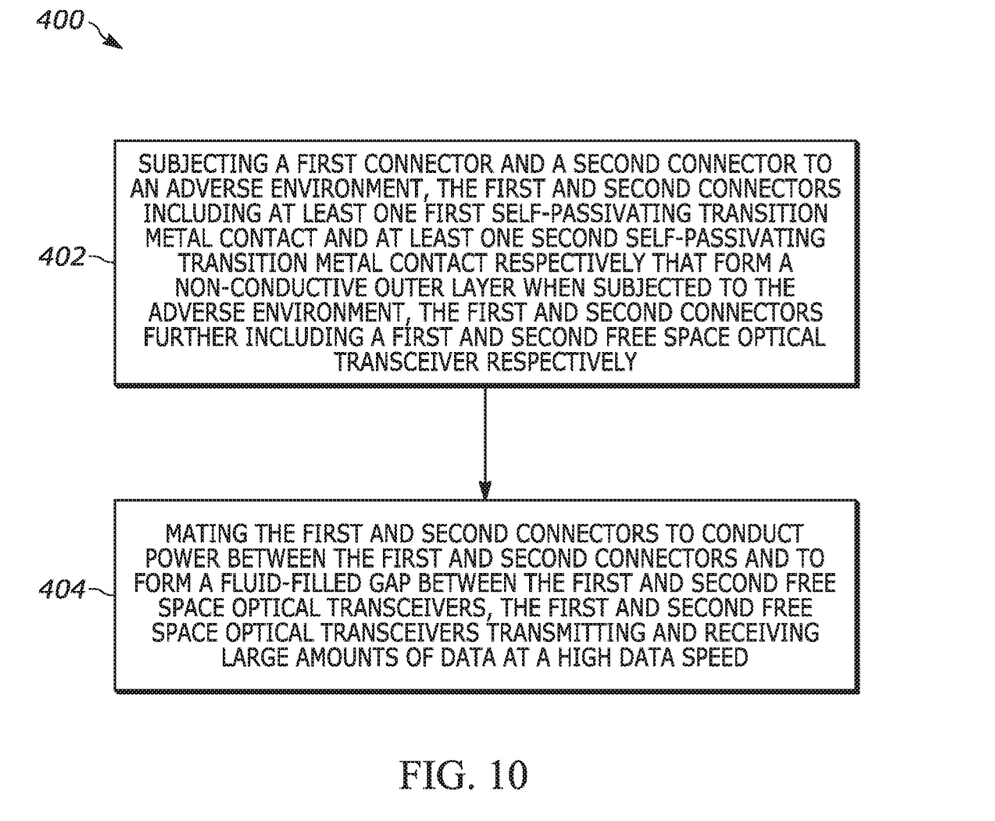
FIG. 10 illustrates an example of a method for transmitting a large amount of data in an underwater connector at a high data speed.

FIG. 10 illustrates an example of a method 400 for transmitting a large amount of data across an underwater connector at a high data speed. At 402, a first connector (e.g., the first mating connector 202) and a second connector (e.g., the second mating connector 206) are subjected to or immersed in an adverse environment (e.g., water). The first connector includes first contacts (e.g., first contacts 210) having at least one first self-passivating transition metal contact that forms a non-conductive outer layer when subjected to the adverse environment and a first free space optical transceiver (e.g., free space optical transceiver 302). The second connector includes second contacts (e.g., second contacts 212) having at least one second self-passivating transition metal contact that forms a non-conductive outer layer when subjected to the adverse environment and a second free space optical transceiver (e.g., free space optical transceiver 302). At 404, the first and second connectors are mated to provide an electrical connection between the first contacts and the second contacts to conduct power between the first and second connectors. A fluid-filled gap (e.g., gap 310) is formed between the first free space optical transceiver and the second free space optical transceiver. The first and second free space optical transceivers transmit and receive a large quantity of data at high data speeds (e.g., 10 Gbps) through the fluid-filled gap.

The high-bandwidth connector disclosed herein reduces the cost of installing and maintaining underwater cable networks. Underwater cables using the high-bandwidth connector can be connected using a wide variety of ROVs or UUVs. This is possible due to the small size and weight of the high-bandwidth connector. As mentioned above, current undersea connectors are bulky and require a great amount of force to be installed which requires the use of cost prohibitedly large ROVs. Large ROVs require large ships and more human operators thereby limiting installation options or forcing designers to redesign the system to not require the use of robotics. Avoiding robotics is not preferred because robots allow for the implementation of networks in an environment that may be dangerous to operators. Whether the cables must be installed at great depths or a network must be established in a hostile environment, the use of robotics would be preferred because of the robotic platform's expendability. If the installation can be accomplished with smaller platforms, many more options would be available by opening the door to smaller companies. Smaller platforms also require less operators and supporting personnel, which reduces the required manpower.

Thus, the marriage of short range FSO communications devices with self-insulating, transition metal contacts has created a novel connector capable of meeting the growing demands of today's underwater networks. The high-bandwidth connecter provides a small and light weight device that can handle large amounts of network traffic and power consumption. It will be an enabling technology that will allow the rapid establishment of seafloor networks with the use of robotics. In addition, the self-insulating feature allows for nearly limitless connection mating cycles, maintenance free operation, the safe handling of live wires, noise immunity, and can be left indefinitely in ocean water. Current connectors capable of transferring equivalent amounts of power and data are substantially larger, heavier, have a limited number of connections, and often require the use of installation jigs for the massive amount of forces required to make the connection.

The descriptions above constitute examples of the disclosure. It is, of course, not possible to describe every conceivable combination of components or method for purposes of describing the disclosure, but one of ordinary skill in the art will recognize that many further combinations and permutations of the disclosure are possible. Accordingly, the disclosure is intended to embrace all such alterations, modifications, and variations that fall within the scope of this application, including the appended claims.

What is claimed is:

1. A system comprising:
a first connector including first contacts and a first optical assembly to transmit and receive free space optical signals; and
a second connector including second contacts and a second optical assembly to transmit and receive the free space optical signals, at least one contact from the first contacts and at least one contact from the second contacts that aligns with the at least one contact from the first contacts being made from a self-passivating transition metal that has a property of forming a non-conductive outer layer when subjected to an adverse environment, the first and second connectors being configured to be coupled to substantially align and enclose the first and second optical assemblies, wherein when the first and second connectors are subjected to the adverse environment, a fluid-filled gap is formed between the first optical assembly and the second optical assembly in response to mating the first and second connectors.

2. The system of claim 1, wherein when the first contacts are mated with the second contacts when subjected to the adverse environment, at least a portion of the non-conductive outer layer is removed from the at least one contact from the first contacts and from the at least one contact from the second contacts via scraping to form an electrically conductive connection.

3. The system of claim 2, wherein the self-passivating transition metal is selected from a group comprising niobium, tantalum, titanium, zirconium, molybdenum, ruthenium, rhodium, palladium, hafnium, tungsten, rhenium, osmium, and iridium.

4. The system of claim 1, wherein the first optical assembly and the second optical assembly each include at least one free space optical transceiver to transmit and receive the free space optical signals, an optical housing that encompasses the free space optical transceiver, the optical housing having a top that includes an opening defined therein, and a lens secured in the opening to allow the free space optical transceiver to transmit and receive the free space optical signals.

5. The system of claim 4, wherein the first optical assembly includes a first processor communicatively connected to the at least one free space optical transceiver of the first optical assembly and the second optical assembly includes a second processor communicatively connected to the at least one free space optical transceiver of the second optical assembly, the first and second processors processing the free space optical signals.

6. The system of claim 4, wherein a gap is defined between the free space optical transceiver and the optical housing.

7. The system of claim 6, wherein the gap may be an air gap or may be filled with a medium that has a refractive index that closely matches a refractive index of the lens.

8. The system of claim 4, wherein the lens is selected from the group consisting of sapphire, acrylic, soda lime, quartz, and borosilicate.

9. The system of claim 1 further comprising status indicators situated on an outer portion or an inner portion of the first connector and/or the second connector.

10. A high-bandwidth underwater electrical connector comprising:
a first connector including first contacts having at least one first self-passivating transition metal contact that forms a non-conductive outer layer when immersed in adverse environment to transmit power and a first free space optical assembly to transmit and receive free space optical signals; and
a second connector including second contacts having at least one second self-passivating transition metal contact that forms a non-conductive outer layer when immersed in the adverse environment to receive power and a second free space optical assembly to transmit and receive the free space optical signals, the first and second connectors being configured to be coupled to substantially align and enclose the first and second free space optical assemblies,
wherein a fluid-filled gap is formed between the first and second free space optical assemblies in response to fastening the first and second connectors while submerged in the adverse environment and where the first and second free space optical assemblies transmit and receive the free space optical signals.

11. The high-bandwidth underwater electrical connector of claim 10, wherein the first free space optical assembly and the second free space optical assembly each include at least one free space optical transceiver to transmit and receive the free space optical signals, an optical housing that encompasses the free space optical transceiver, the optical housing having a top that includes an opening defined therein, and a lens secured in the opening to allow the free space optical transceiver to transmit and receive the free space optical signals.

12. The high-bandwidth underwater electrical connector of claim 11, wherein the first free space optical assembly includes a first processor communicatively connected to the at least one free space optical transceiver of the first free space optical assembly and the second free space optical assembly includes a second processor communicatively connected to the at least one free space optical transceiver of the second free space optical assembly, the first and second processors processing the data transmitted between the first and second connectors.

13. The high-bandwidth underwater electrical connector of claim 11, wherein a gap is defined between the free space optical transceiver and the optical housing, and wherein the gap may be an air gap or may be filled with a medium that has a refractive index that closely matches a refractive index of the lens.

14. The high-bandwidth underwater electrical connector of claim 11, wherein the lens is selected from the group consisting of sapphire, acrylic, soda lime, quartz, and borosilicate.

15. The high-bandwidth underwater electrical connector of claim 10, wherein when the first connector is mated with the second connector while immersed in the adverse environment, at least a portion of the non-conductive outer layer is removed from the at least one first self-passivating transition metal contact and from the at least one second self-passivating transition metal contact via scraping to form an electrically conductive connection.

16. The high-bandwidth underwater electrical connector of claim 10 further comprising status indicators situated on an outer portion or an inner portion of the first connector and/or the second connector.

17. The high-bandwidth underwater electrical connector of claim 10, wherein the self-passivating transition metal is selected from a group comprising niobium, tantalum, titanium, zirconium, molybdenum, ruthenium, rhodium, palladium, hafnium, tungsten, rhenium, osmium, and iridium.

18. A method for transmitting free space optical signals carrying data, the method comprising:
   immersing a first connector and a second connector in an adverse environment, the first connector comprising first contacts having at least one contact made from a self-passivating transition metal that forms a non-conductive outer layer when immersed in the adverse environment and a first free space optical transceiver, the second connector comprising second contacts having at least one contact made from the self-passivating transition metal that forms a non-conductive outer layer when immersed in the fluid and a second free space optical transceiver; and
   mating the first and second connectors to provide an electrical connection between the first contacts and the second contacts to conduct power between the first and second connectors and to form a fluid-filled gap between the first free space optical transceiver and the second free space optical transceiver, the first and second free space optical transceivers transmitting and receiving the free space optical signals through the fluid-filled gap, wherein the at least one first self-passivating transition metal contact being aligned with and connected to the at least one second self-passivating transition metal contact.

19. The method of claim 18, wherein when the first connector is mated with the second connector while immersed in the adverse environment, at least a portion of the non-conductive outer layer is removed from the at least one first self-passivating transition metal contact and from the at least one second self-passivating transition metal contact via scraping to form an electrically conductive connection.

20. The method of claim 18, wherein the self-passivating transition metal is selected from a group comprising niobium, tantalum, titanium, zirconium, molybdenum, ruthenium, rhodium, palladium, hafnium, tungsten, rhenium, osmium, and iridium.

* * * * *